United States Patent [19]

Singer et al.

[11] Patent Number: 5,139,811

[45] Date of Patent: * Aug. 18, 1992

[54] VISCOUS SALAD DRESSING

[75] Inventors: Norman S. Singer, Highland Park, Ill.; Joseph Latella, London; Shoji Yamamoto, Prince Edward Island, both of Canada

[73] Assignee: John Labatt Limited, North London, Canada

[*] Notice: The portion of the term of this patent subsequent to Mar. 29, 2005 has been disclaimed.

[21] Appl. No.: 568,745

[22] Filed: Aug. 17, 1990

Related U.S. Application Data

[63] Continuation-in-part of Ser. No. 367,261, Jun. 16, 1989, Pat. No. 4,961,953, which is a continuation of Ser. No. 127,955, Dec. 2, 1987, abandoned, which is a continuation-in-part of Ser. No. 606,959, May 4, 1984, Pat. No. 4,734,287.

[51] Int. Cl.$^5$ ................................................ A23L 1/24
[52] U.S. Cl. ................................... 426/589; 426/605; 426/656; 426/804
[58] Field of Search ................. 426/605, 656, 804, 589

[56] References Cited

U.S. PATENT DOCUMENTS

| | | |
|---|---|---|
| 2,377,624 | 6/1945 | Gordon . |
| 2,566,477 | 9/1951 | Abrahamczik et al. . |
| 2,602,746 | 7/1952 | Meade . |
| 2,710,808 | 6/1955 | Peebles et al. . |
| 3,066,133 | 11/1962 | Pinckney . |
| 3,300,318 | 1/1967 | Szczesniak et al. . |
| 3,397,997 | 8/1968 | Japikse . |
| 3,507,663 | 4/1970 | Starook et al. . |
| 3,552,981 | 1/1971 | Luksas . |
| 3,594,192 | 7/1971 | Mullen et al. . |
| 3,615,661 | 10/1971 | Ellinger et al. ............ 99/54 |
| 3,620,757 | 11/1971 | Ellinger et al. ............ 99/54 |
| 3,632,350 | 1/1972 | Battista . |
| 3,642,490 | 2/1972 | Hawley et al. , |
| 3,642,492 | 2/1972 | Arndt . |
| 3,642,493 | 2/1972 | Arndt . |
| 3,644,326 | 2/1972 | Pien . |
| 3,689,288 | 3/1972 | Duren . |
| 3,708,307 | 1/1973 | Lundstadt . |
| 3,723,407 | 3/1973 | Miller et al. . |
| 3,726,690 | 4/1973 | Schuppner . |
| 3,737,326 | 6/1973 | Basso et al. . |
| 3,757,005 | 9/1973 | Kautz et al. . |
| 3,793,464 | 2/1974 | Rusch . |
| 3,798,339 | 3/1974 | Peng . |
| 3,800,052 | 3/1974 | Inagami et al. ............ 426/359 |
| 3,829,592 | 8/1974 | Bratland ............ 426/491 |
| 3,842,062 | 10/1974 | Eastman . |
| 3,843,828 | 10/1974 | Arndt ............ 426/360 |
| 3,852,503 | 12/1974 | Magnino et al. ............ 426/364 |
| 3,853,839 | 12/1974 | Magnino et al. ............ 260/123.5 |
| 3,865,956 | 2/1975 | Fukushima et al. ............ 426/195 |
| 3,873,751 | 3/1975 | Arndt ............ 426/356 |
| 3,891,777 | 6/1975 | Boyer ............ 426/573 |
| 3,891,778 | 6/1975 | Boyer ............ 426/573 |
| 3,892,873 | 7/1975 | Kolen et al. ............ 426/602 |
| 3,899,605 | 8/1975 | Schaap ............ 426/582 |

(List continued on next page.)

FOREIGN PATENT DOCUMENTS

| | | |
|---|---|---|
| 0008242 | 2/1980 | European Pat. Off. . |
| 0076549 | 4/1983 | European Pat. Off. . |
| 7505092 | 9/1976 | France . |
| 8022390 | 7/1982 | France . |
| 236449A1 | 6/1986 | German Democratic Rep. . |
| 1363783 | 8/1974 | United Kingdom . |
| 2063273 | 6/1981 | United Kingdom . |

OTHER PUBLICATIONS

Holsinger et al., *Food Technology*, pp. 59, 60, 64 and 65 (Feb. 1973).

Whitaker et al., *Food Proteins*, pp. 173-189 (1977).

*Primary Examiner*—Joseph Golian
*Assistant Examiner*—Evan Federman
*Attorney, Agent, or Firm*—Marshall, O'Toole, Gerstein, Murray & Bicknell

[57] ABSTRACT

The present invention provides a viscous salad dressing formulated with microparticulated protein which serves as a replacement for all or part of the fat and/or oil normally found in a viscous salad dressing.

1 Claim, 1 Drawing Sheet

U.S. PATENT DOCUMENTS

| | | | |
|---|---|---|---|
| 3,914,435 | 10/1975 | Maubois et al. | 426/40 |
| 3,923,375 | 11/1975 | Dalan et al. | 426/583 |
| 3,929,892 | 12/1975 | Hynes et al. | 426/582 |
| 3,930,039 | 12/1975 | Kuipers | 426/271 |
| 3,930,056 | 12/1975 | Feminella et al. | 426/646 |
| 3,935,323 | 1/1976 | Feminella et al. | 426/564 |
| 3,969,534 | 7/1976 | Pavey et al. | 426/34 |
| 3,978,243 | 8/1976 | Pedersen | 426/573 |
| 3,982,039 | 9/1976 | Scibelli et al. | 426/603 |
| 4,018,752 | 4/1977 | Buhler et al. | 260/112 R |
| 4,029,825 | 6/1977 | Chang | 428/271 |
| 4,031,261 | 6/1977 | Durst | 426/565 |
| 4,031,267 | 6/1977 | Berry et al. | 426/656 |
| 4,057,655 | 11/1977 | Okada et al. | 426/583 |
| 4,058,510 | 11/1977 | Concilio-Nolan et al. | 260/112 R |
| 4,072,670 | 2/1978 | Goodnight, Jr. et al. | 260/123.5 |
| 4,079,154 | 3/1978 | Yasumatsu | 426/583 |
| 4,089,987 | 5/1978 | Chang et al. | 426/564 |
| 4,091,116 | 5/1978 | Edwards et al. | 426/42 |
| 4,103,037 | 7/1978 | Bodor et al. | 426/575 |
| 4,103,038 | 7/1978 | Roberts | 426/601 |
| 4,104,413 | 8/1978 | Wynn et al. | 426/582 |
| 4,107,334 | 8/1978 | Jolly | 426/7 |
| 4,113,716 | 9/1978 | Gomi et al. | 260/123.5 |
| 4,125,630 | 11/1978 | Orthoefer | 426/104 |
| 4,137,339 | 1/1979 | Kudo et al. | 426/634 |
| 4,140,808 | 2/1979 | Jonson | 426/583 |
| 4,143,174 | 3/1979 | Shah et al. | 426/570 |
| 4,147,810 | 4/1979 | Kellor | 426/629 |
| 4,169,160 | 9/1979 | Wingerd et al. | 426/40 |
| 4,183,970 | 1/1980 | May et al. | 426/583 |
| 4,186,218 | 1/1980 | Gomi et al. | 426/598 |
| 4,188,411 | 2/1980 | Kuipers et al. | 426/582 |
| 4,192,901 | 3/1980 | Yasumatsu et al. | 426/584 |
| 4,194,018 | 3/1980 | Hodel et al. | 426/580 |
| 4,194,019 | 3/1980 | Yasumatsu et al. | 426/580 |
| 4,205,094 | 5/1980 | Baird et al. | 426/459 |
| 4,209,503 | 5/1980 | Shah et al. | 426/49 |
| 4,212,893 | 7/1980 | Takahata | 426/330.2 |
| 4,218,490 | 9/1980 | Phillips et al. | 426/546 |
| 4,230,738 | 10/1980 | Shemer et al. | 426/656 |
| 4,234,620 | 11/1980 | Howard et al. | 426/656 |
| 4,244,983 | 1/1981 | Baker | 426/582 |
| 4,247,566 | 1/1981 | Inagami et al. | 426/276 |
| 4,248,895 | 2/1981 | Stroz et al. | 426/3 |
| 4,251,562 | 2/1981 | LeGrand et al. | 426/573 |
| 4,252,835 | 2/1981 | Maerker et al. | 426/589 |
| 4,259,361 | 3/1981 | Procter | 426/285 |
| 4,260,636 | 4/1981 | Yasumatsu et al. | 426/34 |
| 4,265,924 | 5/1981 | Buhler et al. | 426/582 |
| 4,267,100 | 5/1981 | Chang et al. | 260/112 R |
| 4,271,201 | 6/1981 | Stenne | 426/40 |
| 4,271,370 | 9/1980 | Rawlings et al. | 426/98 |
| 4,275,084 | 6/1981 | Ohyabu et al. | 426/104 |
| 4,278,597 | 7/1981 | Cho et al. | 260/123.5 |
| 4,279,939 | 7/1981 | Cho | 426/583 |
| 4,291,067 | 9/1981 | Buhler et al. | 426/582 |
| 4,293,571 | 10/1981 | Olofsson et al. | 426/7 |
| 4,305,964 | 12/1981 | Moran et al. | 426/99 |
| 4,305,970 | 12/1981 | Moran et al. | 426/603 |
| 4,307,118 | 12/1981 | Kajs | 426/104 |
| 4,308,294 | 12/1981 | Rispoli et al. | 426/564 |
| 4,325,937 | 4/1982 | Spence et al. | 424/16 |
| 4,325,977 | 4/1982 | Remer | 426/534 |
| 4,333,958 | 6/1982 | Egnell | 426/583 |
| 4,340,612 | 7/1982 | Askman et al. | 426/276 |
| 4,352,832 | 10/1982 | Wood et al. | 426/589 |
| 4,360,537 | 11/1982 | Tan et al. | 426/656 |
| 4,362,761 | 12/1982 | Chang et al. | 426/657 |
| 4,379,175 | 4/1983 | Baker | 426/582 |
| 4,438,148 | 3/1984 | O'Rourke et al. | 426/579 |
| 4,486,345 | 12/1984 | Callewaert | 260/123.5 |
| 4,497,834 | 2/1985 | Barta | 426/42 |
| 4,497,836 | 2/1985 | Marquardt et al. | 426/239 |
| 4,500,454 | 2/1985 | Chang | 260/123.5 |
| 4,515,825 | 5/1985 | Moran et al. | 426/603 |
| 4,572,837 | 2/1986 | Poole et al. | 426/34 |
| 4,675,194 | 6/1987 | Gaffney | 426/39 |
| 4,734,287 | 3/1988 | Singer et al. | 426/41 |
| 4,762,726 | 8/1988 | Soucie et al. | 426/602 |
| 4,885,179 | 12/1989 | Soucie et al. | 426/104 |
| 4,975,287 | 12/1990 | Zibell et al. | 426/3 |

VISCOUS SALAD DRESSING

CROSS REFERENCE TO RELATED APPLICATIONS

This application is a continuation-in-part of our co-pending U.S. patent application Ser. No. 07/367,261 filed Jun. 16, 1989, which issued as U.S. Pat. No. 4,961,953 on Oct. 9, 1990, which was a continuation of our U.S. patent application Ser. No. 07/127,955, filed Dec. 2, 1987, now abandoned, which, in turn, was a continuation-in-part of our U.S. patent application Ser. No. 06/606,959 filed May 4, 1984, which issued as U.S. Pat. No. 4,734,287 on Mar. 29, 1988.

BACKGROUND

The present invention relates to viscous salad dressing compositions which include a microparticulated protein product as described in our allowed U.S. Pat. No. 4,961,953, the entire disclosure of which is incorporated by reference herein.

SUMMARY OF THE INVENTION

The present invention provides a viscous salad dressing having all or part of the fat and/or oil content normally found in a viscous salad dressing replaced with a proteinaceous, water-dispersible, macrocolloid comprising substantially non-aggregated particles of denatured protein having in a dry state a mean diameter particle size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character. Suitable protein sources are animal, vegetable and microbial proteins including, but not limited to, egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and non-dairy whey proteins such as bovine serum albumin, egg white albumin, and vegetable whey proteins (i.e., non-dairy whey protein) such as soy protein. Raw material sources providing soluble globular, non-fibrous proteins which have not previously been subjected to protein denaturing processing (e.g., during isolation) are presently most preferred.

As used herein, the term viscous salad dressing means a viscous product having a texture similar to mayonnaise or starch based salad dressings such as MIRACLE WHIP salad dressing. This viscous product may be readily formulated with a variety of ingredients and flavorings to provide viscous products such as sandwich spreads, tartar sauce and refrigerated spoonable salad dressings.

DETAILED DESCRIPTION OF THE INVENTION

Figure 1:
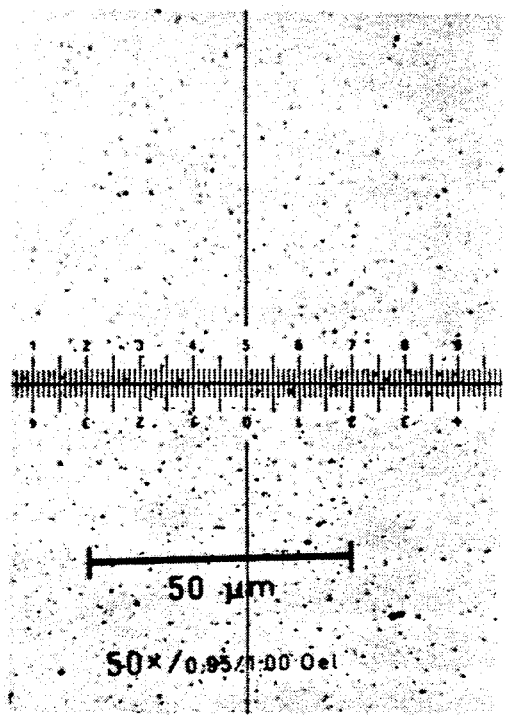
FIG. 1 illustrates a photomicrographic view at 1000x magnification of microparticulated whey protein of the present invention.

The following examples relate to preferred methods and procedures for practicing the present invention. Example 1 relates to a preferred method for the production of microparticulated protein from the proteinaceous material present in acidified whey. Example 2 relates to a preferred method for the production of microparticulated protein from casein micelles and the proteinaceous material present in egg white. Example 3 relates to the production of microparticulated protein from the proteinaceous material in whey. Example 4 relates to the preparation of a viscous salad dressing.

EXAMPLE 1

Microparticulated Protein Produced From Acidified Whey

Microbiologically, aromatically and particulately clean water produced by a reverse osmosis process is added to a sanitary tank.

Commercially available liquid whey protein concentrate is treated by ultrafiltration and evaporation until the concentration of protein is about 50-55% by weight, on a dry basis. The whey protein concentrate is added to the water in the sanitary tank with agitation avoiding aeration through the suction side of a positive displacement pump to achieve a solids concentration of about 37% solids for the mixture.

As this mixture is recirculated back to the sanitary tank, a dilute solution of food acid (acetic, lactic, citric or hydrochloric; alone or in combination) is added through an in-line mixer to lower the pH from about 6.8 to about $4.4 \pm 0.05$.

The pH adjusted mixture is then rigorously deaerated in a Versator deaerator/homogenizeer and bottom fed into a holding tank which is equipped for nonaerating agitation.

The deaerated mix is then pumped (300 lbs/hr) from the holding tank, by a positive displacement pump through an in-line strainer (300 $\mu$m cheesecloth) and a mass flow meter, into a plate heat exchanger which heats the mixture to about 165°-180° F., a temperature lower than the target peak temperature which is achieved within a heat and shear generating apparatus ("microcooker"). Flow is manually-controlled based on readings from the in-line flow-meter.

The heated mixture is pumped directly from the plate heat exchanger into the microcooker apparatus as described in U.S. Pat. No. 4,823,396 with the exception that the inlet and outlet ports have been interchanged or exchanged, i.e., the inlet port is disposed where the outlet port is shown in the patent drawing and the outlet port is located at the bottom of the bowl shaped vessel and the temperature of the mixture is raised to about 200° F. within less than 10 seconds under high shear conditions. Rigorous temperature control of the mixture is maintained at 200° F. by means of a cascade control loop. The control loop senses the temperature of the product exiting the microcooker and maintains it at 200° F. by adjusting the temperature of the mixture leaving the plate heat exchanger.

The speed of the rotor in the microcooker is held constant, for example, at about 3715 rpm. At this rpm, the shear rate is about 27,000 reciprocal seconds at the tips of the rotor which has a diameter of approximately inches.

After exiting the microcooker apparatus, the product flows directly into an eccentric scraped surface heat exchange and is cooled with vigorous agitation to less than 130° F. The cooled product then flows through additional heat exchangers (scraped surface of plate type) to reduce its temperature to less than 55° F.

EXAMPLE 2

Microparticulated Protein Produced from Casein Micelles and Egg White

Microbiologically, aromatically and particulately clean water (16.83 wt. %) produced by a reverse osmosis process is heated in a sanitary tank to about 120° F.

Commercially available apple pectin (0.35 wt. %) dry-blended with sugar (5.0 wt. %) to assure its complete dispersion and is then added to the water in the sanitary tank by means of a high shear solid/liquid Triblender mixer. This mixture is held at about 120°-140° F. with agitation for about 5 minutes to assure hydration and dissolution of the pectin. The mixture is then cooled to less than about 100° F.

Liquid egg white is ultrafiltered using membrane filters having a molecular weight cut-off of about 10,000. The ultrafiltration reduces the total volume of the liquid egg white by about 50% and effectively doubles the protein content and halves the sodium content of the egg white. The treated egg white (55 wt. %) is added to the pectin solution through the suction side of a positive displacement pump with controlled agitation to avoid aeration.

Condensed skim milk (22.65 wt. %) is then added to the mixture through the suction side of a positive displacement pump.

As this mixture is recirculated back to the sanitary tank, a dilute solution of food acid (0.17 wt. %) (acetic, citric, lactic or hydrochloric; alone or in combination) is added through an in-line mixer to lower the pH from about 7 to about 6.20±0.05.

The pH adjusted mix is then rigorously deaerated in a Versator deaerator and bottom-fed into a holding tank which is equipped for non-aerating agitation.

The deaerated mixture is then pumped (600 lb/hr) from the holding tank, by a positive displacement pump through an in-line strainer (300 μm cheesecloth) and a mass flow meter into a plate heat exchanger which heats the mixture to about 165° F., a temperature lower than the target peak temperature which is achieved within the microcooker apparatus described in Example 1. At this lower temperature no coagulate will have developed. Flow is manually-controlled based upon readings from the in-line flow-meter.

The heated mixture is pumped directly from the plate heat exchanger into the microcooker apparatus and the temperature of the mixture is raised to about 185° F. within less than about 10 seconds under high sheer conditions. Rigorous temperature control is maintained over the temperature of the mixture in the microcooker apparatus by a cascade control loop. The control loop senses the temperature of a product exiting the microcooker and holds the temperature constant by regulating the temperature of the mixture leaving the plate heat exchanger.

The speed of the rotor in the microcooker is held constant at about 5400 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through additional heat exchangers (scraped surface or plate type) to reduce its temperature to less than 55° F.

EXAMPLE 3

Microparticulated Protein Produced From Whey

Commercially available liquid whey is treated by ultrafiltration and evaporation to give a mixture having about 42% by weight solids and about 50% -55% by weight protein, on a dry basis. The resulting whey protein concentrate is deaerated in a Versator deaerator and bottom fed into a sanitary tank equipped for a non-aerating agitation.

The deaerated mixture is then pumped (600 lbs/hr), by a positive displacement pump through an in-line strainer (300 μm cheesecloth), a mass flow meter and plate heat exchanger which raises the temperature of the mixture to about 170° F., into a heated holding device.

The heated holding device includes two concentric scraped surface heat exchangers connected in series. within less than about 10 seconds under high sheer conditions. Rigorous temperature control is maintained over the temperature of the mixture in the microcooker apparatus by a cascade control loop. The control loop senses the temperature of a product exiting the microcooker and holds the temperature constant by regulating the temperature of the mixture leaving the plate heat exchanger.

The speed of the rotor in the microcooker is held constant at about 5400 rpm. At this rpm, the shear rate is about 40,000 reciprical seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through additional heat exchangers (scraped surface or plate type) to reduce its temperature to less than 55° F.

EXAMPLE 3

Microparticulated Protein Produced From Whey

Commercially available liquid whey is treated by ultrafiltration and evaporation to give a mixture having about 42% by weight solids and about 50%-55% by weight protein, on a dry basis. The resulting whey protein concentrate is deaerated in a Versator deaerator and bottom fed into a sanitary tank equipped for a non-aerating agitation.

The deaerated mixture is then pumped (600 lbs/hr), by a positive displacement pump through an in-line strainer (300 μm cheesecloth), a mass flow meter and plate heat exchanger which raises the temperature of the mixture to about 170° F., into a heated holding device.

The heated holding device includes two concentric scraped surface heat exchangers connected in series. Each heat exchanger provides a hold time of about 3.6 minutes at a flow rate of about 300 lbs/hr. Both of these heat exchangers are heated to maintain the hold temperature set by the plate heat exchanger.

The mixture is then pumped from the holding device to an eccentric scraped surface heat exchanger. This scraped surface heat exchanger cools the mixture to a temperature of about 165° F., a temperature lower than the target peak temperature inside a heat and high shear generating apparatus (microcooker). The mixture then flows directly into the microcooker apparatus as described in Example 1 and the temperature of the mixture is raised to 200° F. within 10 seconds under high shear conditions. Rigorous temperature control at 200° F is maintained in the microcooker by a cascade control loop. The control loop senses the temperature of a product exiting the microcooker and holds the temperature constant by regulating the temperature of the mixture leaving the eccentric scraped surface heat exchanger.

The speed of the rotor in the microcooker is held constant at about 5200 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through an additional heat exchanger (scraped surface or plate type) to reduce its temperature to less than 55° F.

EXAMPLE 4

Preparation of a Viscous Salad Dressing

A viscous salad dressing is produced from the ingredients listed in Table 1.

TABLE 1

| Viscous Salad Dressing | |
|---|---|
| Ingredients | Wt. % of Composition |
| Water | 25-45 |
| Starch | 3-6 |
| Maltodextrin | 0.2-3 |
| Sugar | 5-10 |
| Salt | 2-4 |
| Cellulose Gel | 0-2 |
| Gum/Stabilizers | 0.01-0.1 |
| Spice | 0.01-1.0 |
| Potassium Sorbate | 0.05-0.3 |
| Sodium Benzoate | 0.05-0.3 |
| EDTA | 0-0.006 |
| Vinegar (100 Gr.) | 5-15 |
| Microparticulated Protein | 10-40 |
| Pectin | 0.01-0.1 |
| Egg Yolk (salted) | 0.5-3 |
| Whole Egg | 2-5 |
| Oil | 0-20 |
| Antioxidant | 0-0.01 |

The dry ingredients, food starch (4.3%, DRESSN 400 Starch), maltodextrin (0.543%, LODEX 5 Maltodextrin), salt (2.74%), sugar (8.7%), spice (0.025%, McCormick-Stange), EDTA (0.003%, Tri-K Industries), potassium sorbate (0.05%, Tri-K Industries), sodium benzoate (0.05%, Tri-K Industries) and antioxidant (0.01%, SUSTANE Antioxidant Q, UOP) were blended at ambient temperature and added to a mixture of water (34.86%), cellulose gel (0.852%, AVICEL Cellulose gel) and xanthan gum (0.012%, Keltrol-RD). The combined mixture was then blended for 10 minutes. The vinegar (9.13%, Fleischmann) was added slowly and the mixture was deaerated to give a starch base.

The deaerated starch base was heated to 195° F. for 30 seconds in a high temperature short time plate pasteurizer and then cooled to 70° F.

The remaining amount of water (0.4 wt.%) and the pectin (0.03%, Hercules JMJ) were blended for 5 minutes in a jacketed kettle. The microparticulated protein (produced according to the procedures of Example 2, 24.57%) was added to the pectin and water and the mixture was blended for 30 minutes without whipping. The starch base, egg yolk (1.0%), whole egg (3.135%), and corn oil (9.99%, ADM) were then added to the fat substitute and pectin mixture and blended for 15 minutes. The combined mixture was then passed through a kinematic mixer at a 45% shear setting. Finally, the sheared product was packaged at 70° F.

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. A viscous salad dressing, wherein the improvement comprises replacing all or part of the normal fat and/or oil content of the viscous salad dressing with a proteinaceous, water-dispersible, macrocolloid comprising substantially non-aggregated particles of denatured non-dairy whey protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

* * * * *